United States Patent [19]

Chesnut et al.

[11] Patent Number: 4,934,231
[45] Date of Patent: Jun. 19, 1990

[54] ROTARY DIE-CUTTING APPARATUS

[75] Inventors: W. Richard Chesnut, Essex Fells; Daniel Calligaro; Vincent Trapasso, both of Little Falls, all of N.J.

[73] Assignee: W. R. Chestnut Engineering, Inc., Fairfield, N.J.

[21] Appl. No.: 335,993

[22] Filed: Apr. 10, 1989

[51] Int. Cl.$^5$ ............................................. B26D 7/26
[52] U.S. Cl. ...................................... 83/343; 83/659; 83/663; 83/673; 83/675; 83/698
[58] Field of Search ................. 83/343, 345, 346, 347, 83/495, 659, 508.2, 673, 675, 677, 663, 665, 678, 698, 670; 101/415.1

[56] References Cited

U.S. PATENT DOCUMENTS

| | | | |
|---|---|---|---|
| 244,979 | 8/1881 | Clause | 83/677 |
| 565,186 | 8/1896 | Taylor | 83/677 |
| 1,461,068 | 7/1923 | Regensteiner | 101/415.1 |
| 1,579,182 | 3/1926 | Thayer | 83/345 |
| 1,584,868 | 5/1926 | Kutter | 83/665 |
| 1,614,801 | 1/1927 | Osterlind | 101/415.1 |
| 3,954,034 | 5/1976 | Broderick | 83/678 |
| 4,455,903 | 6/1984 | Kesten | 83/659 |
| 4,646,603 | 3/1987 | Held | 83/665 |

*Primary Examiner*—Frank T. Yost
*Assistant Examiner*—Scott A. Smith
*Attorney, Agent, or Firm*—John N. Bain; Raymond J. Lillie; Jeremiah G. Murray

[57] ABSTRACT

A rotary die-cutting apparatus having cylindrical rollers mounted for rotation on spaced parallel axes. Die plates are mounted on the rollers in tight surface-to-surface contact with the outside surfaces thereof. Each roller has a body with a generally cylindrical outside surface and two longitudinal channels formed therein. The die plates are formed as thin flexible sheets of metal having their ends welded to one of the bars for mounting the sheets on the outside surface of the rollers. A wedge-shaped bar is slideably mounted in the other channel. After the ends of the die plate are welded to the weld bar in butting relation, the die plate is mounted on the roller with the wedge bar removed from its associated channel. After the plate is mounted on the roller, the wedge bar is slid into the channel and gradually forced against the die plate to bring it into surface-to-surface contact with the roller.

8 Claims, 3 Drawing Sheets

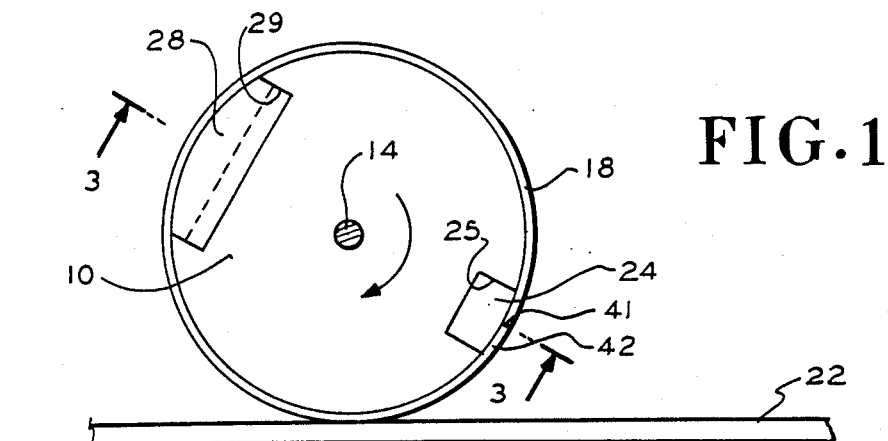
FIG. 1
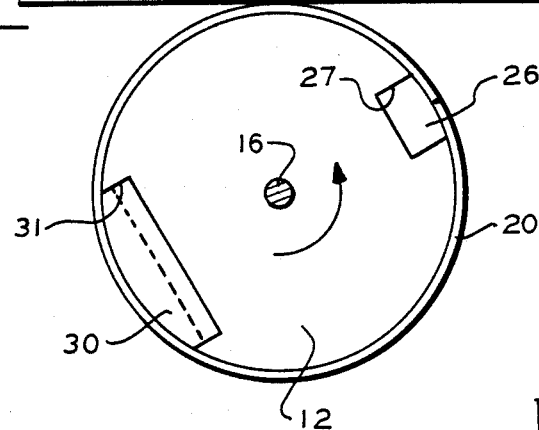
FIG. 2
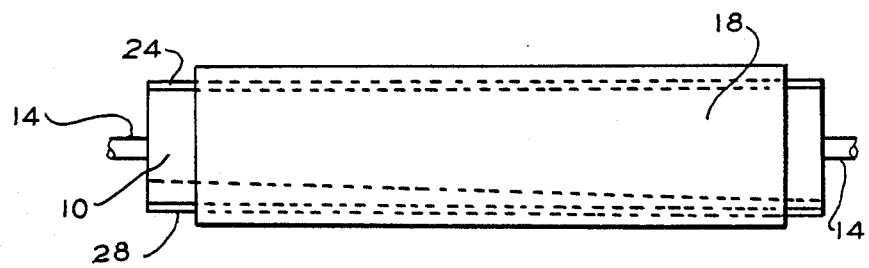
FIG. 3
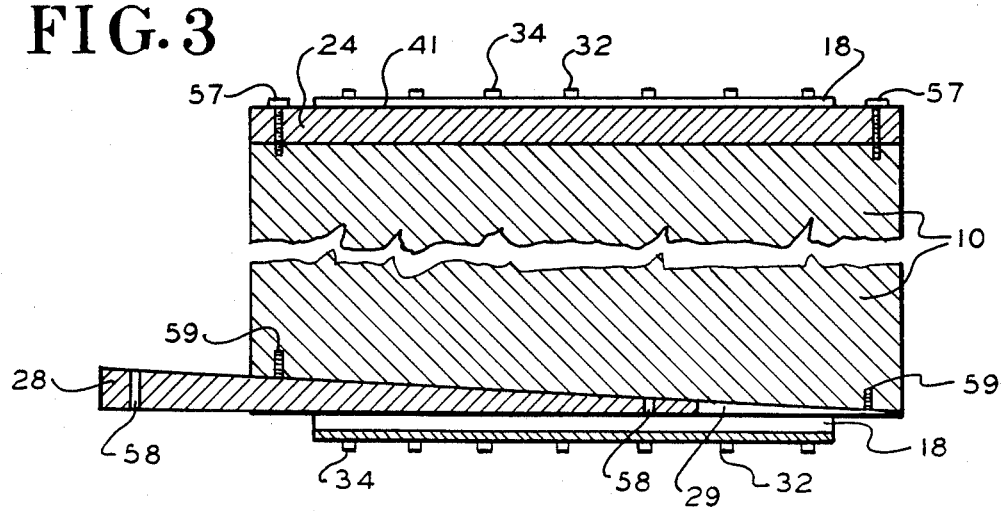

ROTARY DIE-CUTTING APPARATUS

BACKGROUND OF THE INVENTION

This invention relates to die-cutting apparatus. More particularly, this invention relates to apparatus for mounting a die sheet in surface-to-surface contact with a die roller.

Equipment for cutting and scoring continuous webs of material, such as paper, sheet metal, cardboard and the like, typically include a pair of high-speed rotary cylinders that carry one or more working elements that operate on the webs as they are fed between the cylinders. In certain applications, the working elements are formed from thin flexible metal sheets that are designed to be mounted on the outside surface of the rotary cylinders. Each metal sheet, often called a die plate, has an array of cutting and scoring elements formed on the outside surface thereof and is normally mounted on a roller that is in synchronous rolling opposition with a second roller carrying a second sheet. The array of cutting and scoring elements on the two sheets are correspondingly formed so that they functionally mate to work against each other on opposite sides of the web as it passes between the rollers. One of the most critical problems confronting developers of such equipment has been the development of simple yet effective means for mounting the flexible die plates on the outside surface of the rollers. More specifically, developers have long recognized the need for rollers having mounting structures that are capable of accurately mounting the sheets in precise surface-to-surface contact on the outside surface thereof.

One example of a prior art apparatus that addressed this need may be found in U.S. Pat. No 4,187,752. In the '752 patent, the roller has a channel formed in its outside surface into which the ends of the sheets that constitute the die plate are inserted. Means are provided in the channel for gripping the sheet and pulling it into surface-to-surface contact with the roller. Bridging elements are mounted across the channel so that continuous cuts may be made. Although this and other prior art structures have served the purpose, they have not proved entirely satisfactory under all conditions of service for the reason that considerable difficulty has been experienced as a result of the complex structures employed therein as exemplified by the channel-bridging-gripping structures of the '752 patent. As such, attempts have been made by those skilled in these arts to develop simpler structures that eliminate the need for bridges and like devices. However, most attempts at eliminating the bridges have resulted in still more complex gripping structures that are often cumbersome to use and expensive to employ.

SUMMARY OF THE INVENTION

The present invention fills the need for a highly reliable rotary die-cutting apparatus that has all of the advantages and capabilities of similarly employed structures and has none of the above described disadvantages. To attain this, the present invention provides a unique roller having a means for mounting a die plate thereon and a wedging means for forcing the plate into accurate surface-to-surface contact with the roller.

As such, it is the object of this invention to provide a die plate mounting and fitting means that will readily force die plates into tight surface-to-surface engagement with roller surfaces.

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

BRIEF DESCRIPTION OF THE DRAWINGS

FIG. 1 is a side elevation of the preferred embodiment of the invention;

FIG. 2 is a front elevation of a portion of the apparatus shown in FIG. 1;

FIG. 3 is a front elevation in section taken on the lines 3—3 in FIG. 1, looking in the direction of the arrows;

DESCRIPTION OF THE PREFERRED EMBODIMENT

Figure 5:
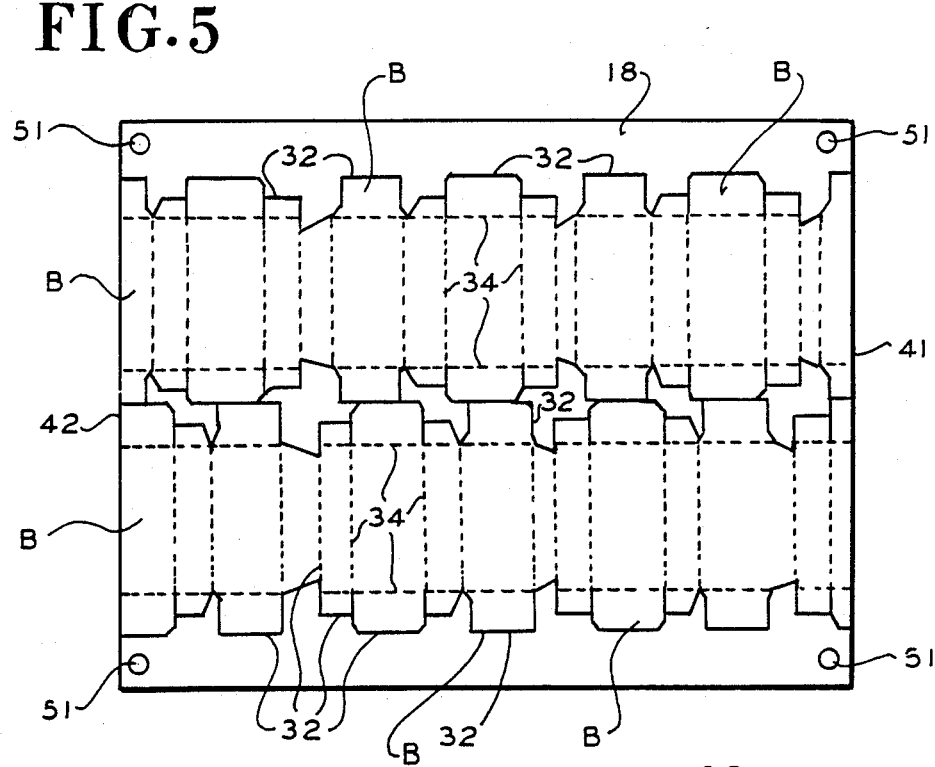
FIG. 5 is a plane view of a portion of the invention.
Figure 4:
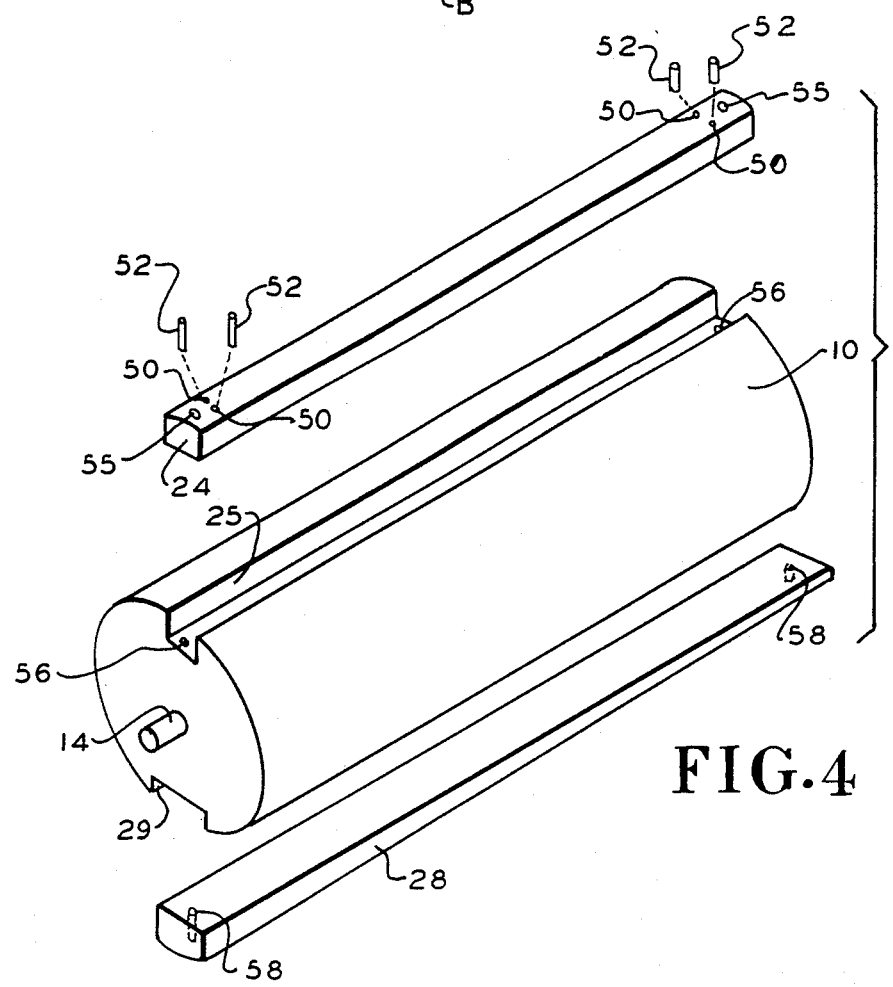
FIG. 4 is an exploded perspective view of certain parts of the invention.

FIG. 1, which illustrates the preferred embodiment, shows cylindrical rollers 10, 12 mounted for rotation on spaced parallel axles 14, 16, respectively. Rollers 10, 12 have die plates 18, 20, respectively, mounted thereon in tight surface-to-surface contact with the outer surfaces of rollers 10, 12. The axles 14, 16 are spaced such that a gap is created between the outer surfaces of plates 18, 20 in a manner that will become clear after consideration of FIGS. 7, 8. The rollers 10, 12 rotate synchronously in opposite directions, as shown by the arrows in FIG. 1, to permit a web 22 of material such as cardboard, paper, sheet metal, etc., to pass linearly (to the left in FIG. 1) between the outer surfaces of plates 18, 20 to achieve proper cutting or scoring or both of the web 22 in a manner well known to those skilled in these arts. Rollers 10, 12 have die-plate mounting means, referred to as weld bars 24, 26, and die plate fixing means, shown as wedge bars 28, 30, mounted in channels 25, 27, 29, 31.

Figure 7:
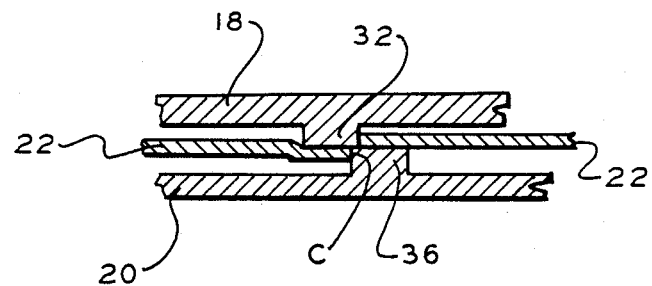
FIGS. 7 and 8 are sectional views of details of certain parts of the invention.
Figure 8:
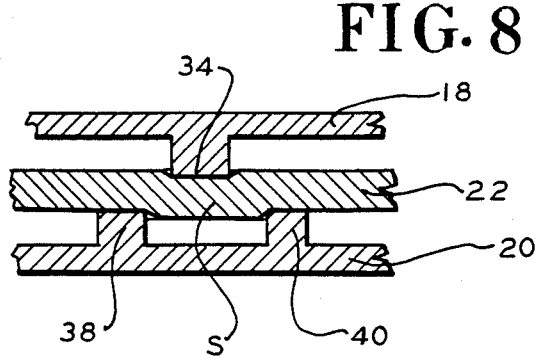

In a typical die-cutting apparatus, one of the die-plates, e.g., plate 18, would be designated the male die plate and the other plate 20 would then become the female die plate. As shown in FIGS. 7 and 8, the die plate 18 has a male cutting land 32 and a male score land 34. Female die plate 20 has a female cutting land 36 and spaced female score lands 38, 40. The cutting lands 32, 36 overlap each other a small amount such that web 22 is pinched between their edges. This pinching causes the web 22 to be cut. The male score land 34 passes between female score lands 38, 40 such that a weakened score line is impressed on web 22. The score line is then used to crease the web 22 in forming the finished product such as a box or the like.

Returning now to FIG. 1, it can be seen that the rollers 10, 12 are formed as right circular cylinders. The roller-plate assemblies 10, 18 and 12, 20 are substantially identical; the only exception is that the lands on the plates 18, 20 will differ since one plate is a male plate and the other is a female plate. For this reason, further details of this invention will be primarily presented with reference to roller 10 and plate 18 only, it being understood that the roller 12 and the plate 20 are similarly constructed.

The roller 10 is seen as extending just past the sides of plate 28 (FIGS. 2, 3). The weld bar 24 and the wedge bar 28 extend the full length of roller 10 (FIG. 2) and they have outside cylindrical surfaces that match the outside cylindrical surface of roller 10 (FIG. 1). The bar 24 is of a uniform thickness as is the depth of the corresponding channel 25 in which it is to be mounted. The wedge bar 28 is, as its name implies, wedge-shaped having a greater thickness at one end than it has at the other end. The corresponding channel 29, into which the bar 28 is to be mounted has a bottom wall that is inclined with respect to the outside surface of the roller 10 such that the channel 29 is also wedge-shaped with the same dimensions as the dimensions of bar 28.

The weld bar 24 is used for mounting plate 18 on the roller 10 such that the ends 41, 42 of plate 18 are in butting relation. The ends 41, 42 are spot welded to weld bar 24. Because it is critical that the plate 18 be placed on the roller 10 in a precise fashion, the weld bar 24 is removable from the roller 10 so that it and plate 18 may be brought to a precision spot welding machine (not shown) to effect such mounting.

With particular reference to FIG. 5, there is shown an array of cutting lands 32, shown as solid lines, and score lands 34, shown as dashed lines, which form a closed pattern of a plurality of boxes B. The lands 32, 34 that terminate at the ends 41, 42 are designed to match with each other when the ends 41, 42 are fixed in butting relation on weld bar 24. As such, lands for forming score lines and cut lines of a variety of configurations, e.g. straight, curve, biased, etc., may run directly across the seam formed by butting ends 41, 42.

Figure 6:
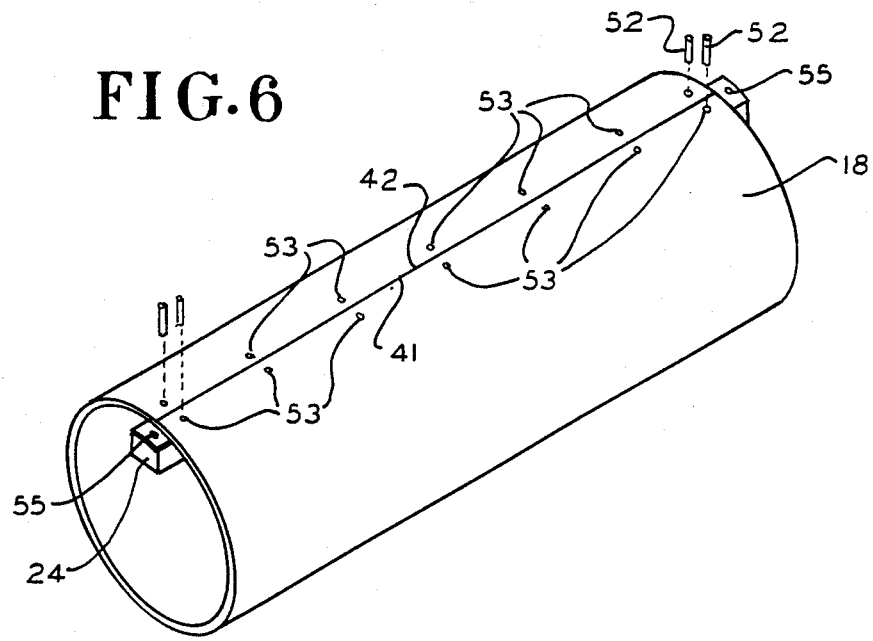
FIG. 6 is a perspective of certain parts of the invention.

To assist in plate alignment during the welding operation, the weld bar 24 has four pin holes 50, two at either end, and the die plate 18 has four alignment holes 51 at the four corners thereof for superposition with pin holes 50. Four alignment pins 52 are provided for snuggly fitting in holes 51 and 50 to assist in the alignment of the ends 41, 42 to assure the butting relationship (FIG. 6). With the ends 41, 42 in proper alignment and pressed against the surface of bar 24, the spot welder (not shown) will weld the ends 41, 42 to bar 24 at points 53. When the plate 18 is attached to weld bar 24, it forms a figure having an inside circumference substantially equal to the outside circumference of roller 10 with both bars 24, 28 mounted in their respective channels 25. 29. After the bar 24 and plate 18 are welded (FIG. 6), the pins 52 are removed and the welded assembly is mounted on roller 10, absent the wedge bar 28, by sliding bar 24 in channel 25.

After assembling the plate 18 and bar 24 on roller 10, the next step is to insert the narrow end of the wedge bar 28 in the wide end of channel 29. The bar 28 is then forced into channel 29 (FIG. 3) until the plate 18 has been brought into tight surface-to-surface contact with roller 10. At this point, the bores 58, at either end of bar 28, and corresponding threaded bores 59, at either end of channel 29, should be aligned. Bolts, similar to bolts 57, may be inserted in bores 58, 59 to fix bar 28 in the assembled position. It has been found, however, that bolts are generally not necessary under most applications since the wedge bar 28, when sufficiently forced into channel 29, will be readily retained therein by friction.

The assembled plate 18 may be removed from bar 24 by simple chisel belows along the various spot welds at points 53. New bars 24 may be used with each application of new plates 18 or used bars 24 may be refinished for additional use. The use of multiple bars 24 with different plates will, in many cases, permit quick change overs between different runs.

Various modifications are contemplated and may obviously be resorted to by those skilled in the art without departing from the spirit and scope of the invention, as herein after defined by the appended claims, as only a preferred embodiment thereof has been disclosed.

What is claimed is:

1. A rotary die-cutting apparatus comprising:
    a roller having a body with a generally cylindrical outside surface and having first and second longitudinal channels formed in said surface;
    a first bar removably mounted in said first channel;
    a die plate formed as a thin flexible sheet having the ends thereof in abutment and attached to said first bar; and
    a wedge-shaped bar slideably mounted in said second channel and having an outside surface contiguous with said outside surface of said body and in contact with said sheet.

2. The apparatus of claim 1 further including means for fixing said bars in said channels.

3. The apparatus of claim 1 wherein each of said first and second longitudinal channels has substantially parallel side walls and a bottom wall perpendicular to said side walls.

4. The apparatus of claim 1 wherein said first and second longitudinal channels are formed on opposite sides of said body.

5. A rotary die-cutting apparatus comprising:
    first and second rollers having spaced parallel axes of rotation,
    each of said rollers having a body with a generally cylindrical outside surface and having first and second longitudinal channels formed in said outside surface;
    first and second bars removably mounted in said first channels of said first and second rollers, respectively;
    first and second die plates each formed as a thin flexible sheeting having the ends thereof in abutment and attached to said first and second bars, respectively; and
    first and second wedge-shaped bars each slidably mounted in said second channels of said first and second rollers, respectively, and each of said first and second wedge-shaped bars having an outside surface contiguous with said outside surface of said body and in contact with said sheeting.

6. The apparatus of claim 5 further including means for fixing said bars in said channels.

7. The apparatus of claim 3 wherein the depth of said first channel is uniform over the length thereof.

8. The apparatus of claim 3 wherein said bottom wall of said second channel forms an inclined plane with respect to said body of said roller.

* * * * *